(12) United States Patent
Philbrick et al.

(10) Patent No.: US 12,001,542 B1
(45) Date of Patent: Jun. 4, 2024

(54) INCIDENT RESPONSE FOR CONTAINERS AND SERVERLESS FUNCTIONS

(71) Applicant: UIPCO, LLC, San Antonio, TX (US)

(72) Inventors: Ashley Raine Philbrick, San Antonio, TX (US); Ryan Thomas Russell, San Antonio, TX (US); David Joaquin Harris, San Antonio, TX (US); Sacha Melquiades De'Angeli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 349 days.

(21) Appl. No.: 17/158,832

(22) Filed: Jan. 26, 2021

Related U.S. Application Data

(60) Provisional application No. 62/968,665, filed on Jan. 31, 2020.

(51) Int. Cl.
*G06F 9/455* (2018.01)
*G06F 21/53* (2013.01)

(52) U.S. Cl.
CPC .......... *G06F 21/53* (2013.01); *G06F 9/45558* (2013.01); *G06F 2009/45562* (2013.01); *G06F 2009/45587* (2013.01); *G06F 2221/034* (2013.01)

(58) Field of Classification Search
CPC ................. G06F 21/53; G06F 9/45558; G06F 2009/45562; G06F 2009/45587; G06F 2221/034
See application file for complete search history.

(56) References Cited

U.S. PATENT DOCUMENTS

| | | | | |
|---|---|---|---|---|
| 7,436,297 | B1* | 10/2008 | Tucker | G08B 25/04 340/508 |
| 8,763,085 | B1* | 6/2014 | Durie | G06F 21/44 726/25 |
| 10,185,823 | B1* | 1/2019 | Adogla | G06F 21/53 |
| 10,958,478 | B2* | 3/2021 | Krause | H04L 12/4641 |
| 11,050,787 | B1* | 6/2021 | Sharifi Mehr | G06F 9/45558 |
| 11,100,217 | B1* | 8/2021 | Natanzon | H04L 41/0869 |
| 11,265,346 | B2* | 3/2022 | Xiao | H04L 63/1425 |
| 11,290,486 | B1* | 3/2022 | Allen | H04L 63/1416 |
| 2016/0301676 | A1* | 10/2016 | Gounares | H04L 63/0428 |
| 2018/0262529 | A1* | 9/2018 | Allen | G06F 21/566 |
| 2018/0293374 | A1* | 10/2018 | Chen | G06F 9/45558 |
| 2018/0336351 | A1* | 11/2018 | Jeffries | G06F 21/577 |
| 2021/0194853 | A1* | 6/2021 | Xiao | H04L 63/0281 |

FOREIGN PATENT DOCUMENTS

EP  3057283 A1 * 8/2016

\* cited by examiner

*Primary Examiner* — Lynn D Feild
*Assistant Examiner* — Abdullah Almamun
(74) *Attorney, Agent, or Firm* — Fletcher Yoder, P.C.

(57) ABSTRACT

A container system includes a container server that is configured to host a first container that includes an execution of a first image. The container server is also configured to receive a request to access the first container and receive an indication that the request to access is a potential security threat. In response to receiving the indication, the container server generates a second image that includes a copy of the first image. Additionally, in response to receiving the indication, the container server provides access to a second container that includes an execution of the second image.

20 Claims, 2 Drawing Sheets

US 12,001,542 B1

INCIDENT RESPONSE FOR CONTAINERS AND SERVERLESS FUNCTIONS

CROSS-REFERENCE TO RELATED APPLICATIONS

The present disclosure is related to, and claims priority to, U.S. Provisional Patent Application Ser. No. 62/968,665, titled "Incident Response for Containers and Serverless Functions," which was filed on Jan. 31, 2020, and which is herein incorporated by reference in its entirety for all purposes.

BACKGROUND

The field of the disclosure generally relates to internet security. More specifically, the present application describes techniques for responding to security breaches involving containers and serverless functions.

Containers may be used to provide operating system level virtualization. For example, containers may be utilized to enable multiple users to use multiple operating systems or applications that are contained in a single package (e.g., a container). Serverless functions are generally programmatic functions that are hosted on hardware that is typically managed by one party, and the functions may be invoked by another party. For example, serverless functions may be hosted on a server owned by one entity, and another entity may invoke the functions by communicating with the server via the internet. Accordingly, in the event of a security incident involving containers and serverless functions, such as hackings or attempted hackings, the party being hacked may not have access to the physical components (e.g., hardware) that is being accessed by an unwanted party. As such, it may be useful for the party whose containers and/or serverless functions are potentially the subject of a security breach to be able to recognize and respond to the security breach.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a container system includes a container server that is configured to host a first container that includes an execution of a first image. The container server is also configured to receive a request to access the first container and receive an indication that the request to access is a potential security threat. In response to receiving the indication, the container server generates a second image that includes a copy of the first image. Additionally, in response to receiving the indication, the container server provides access to a second container that includes an execution of the second image.

In another embodiment, a non-transitory computer-readable medium includes instructions that, when executed by one or more processors, cause the one or more processors to host a first container that includes an execution of a first image, receive a request to access the first container, and receive an indication that the request to access is a potential security threat. In response to receiving the indication, the one or more processors generate a second image that includes a copy of the first image and provide access to a second container that includes an execution of the second image.

In yet another embodiment, a method includes hosting, via a one or more processors, a first container that includes an execution of a first image, receiving, via the one or more processors, a request to access the first container, and receiving, via the one or more processors, an indication that the request to access is a potential security threat. The method also includes, in response to receiving the indication, generating, via the one or more processors, a second image comprising a copy of the first image, and providing, via the one or more processors, access to a second container that includes an execution of the second image.

DRAWINGS

These and other features, aspects, and advantages of the present disclosure will become better understood when the following detailed description is read with reference to the accompanying drawings in which like characters represent like parts throughout the drawings, wherein.

Figure 1:
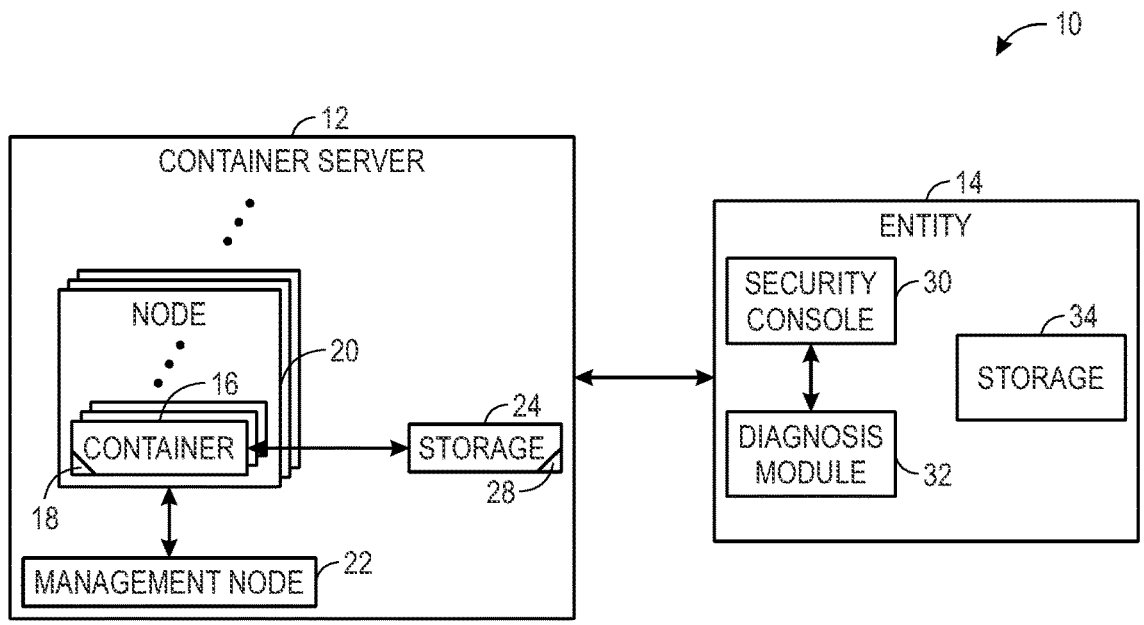
FIG. 1 depicts a block diagram of a container system, in accordance with aspects of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. The terms "optional" or "optionally" mean that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device" and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

In general, the present disclosure relates to internet security. In particular, the techniques discussed herein may be used to implement recognize and respond to security threats involving containers or serverless functions, which may increase online security associated with containers and serverless functions. For instance, in response to determining a security breach or potential security breach, another entity that uses the containers or serverless functions may request the entity that hosts the containers or serverless functions to perform certain actions discussed herein that mitigate the breach. Furthermore, techniques described herein may enable a separate, immutable version of data (e.g., used in association with, or by, a container or serverless function) to be maintained, and unique instances of the data (e.g., copies of the immutable version of the data) may be provided to users attempting to access the containers or serverless functions. Furthermore, while much of the discussion below is provided in the context of containers, it should be noted that the techniques described below are applicable to, and can be used in conjunction with, serverless functions and entities that provide serverless functions.

With the preceding context in mind, FIG. 1 is a block diagram of a container system 10. As illustrated, the container system 10 includes a container server 12 and an entity 14. The entity 14 may be any suitable computing device, such as a general or special-purpose personal computer, a laptop computer, a tablet computer, a mobile computer, a server, and the like that is configured in accordance with present embodiments. For example, the entity 14 may generally refer to electronic devices such as computers and servers that belong to, or are associated with, the entity 14. The entity 14 may include various types of components that may assist the entity 14 in performing various types of computer tasks and operations. For example, the entity 14 may include one or more processors, one or more databases, and a communication device. In addition, the entity 14 may include memory, a display, input/output (I/O) ports, and the like. Furthermore, the container server 12 may include one or more processors, input/output circuitry, memory, and storage, among other things. Additionally, it should be noted that the container server 12 may be owned and managed by an entity other than the entity 14. For example, the entity 14 may be a user or group of users that utilize the container server 12 to access containers 16 and applications 18 that are implemented via hardware that is maintained by the other entity.

As illustrated, the container server 12 includes nodes 20 that include the containers 16. The container server 12 may also include a management node 22 and storage 24. The nodes 20 may generally refer to a group of containers 16 that are associated with one or more common features of the container server 12. For example, each node 20 may be a group of containers 16 that are associated with a common Internet Protocol (IP) address.

The containers 16 may be used to provide operating system level virtualization. For example, the containers 16 may be utilized to enable users (e.g., associated with the entity 14) to use the applications 18 (e.g., software such as operating systems or executable programs) that are contained in one or more of the containers 16. Similarly, in other embodiments, the container server 12 may be a server that hosts serverless functions used by the entity 14. In other words, in other embodiments, the container 16 may be serverless functions that are performed by the container server 12, for example, in response to the entity 14 requesting the serverless functions be performed.

The container server 12 may implement the nodes 20 and containers 16, for example, by utilizing one or more processors included in the container server 12 to execute instructions stored on a non-transitory computer-readable medium. The container server 12 may provide the container 16 to the entity 14, for example, in response to a request from the entity 14. More specifically, the container 16 may be a software image, and the entity 14 may execute software that enables an application to utilize the software image of the container 16 to implement the container 16. Accordingly, the containers, such as the container 16, may be executions of an image.

The entity 14 may access the container server 12, for instance, via the Internet in order to access one or more of the containers 16 of serverless functions that are provided by the container server 12. For example, users within the entity 14 may utilize the container 16 in order to run software that is available via the container 16, such as the applications 18.

As noted above, the container server 12 may also include the management node 22, which may control operations of the container server 12. As discussed below, the management node 22 may receive communications (e.g., requests) from the entity 14 for actions to be performed, for example, in response to the entity 14 determining that an unwanted party (e.g., a hacker) is trying to access or has gained access to the container 16. Additionally, the container server 12 may include the storage 24, which may be a storage device and/or a memory device that stores data for, or associated with, the containers 16. For instance, a portion 28 of the storage 24 may be used to store data for a datastore accessible by the containers 16.

As illustrated, the entity 14 may include a security console 30, a diagnosis module 32, and storage 34. The security console 30 may receive communications (e.g., data) from the containers 16. For example, the security console 30 may receive alerts or notifications regarding users or devices that access or attempt to access containers maintained by the container server 12 (e.g., container 16). The security console 30 may generate, receive, and maintain data (e.g., logs) regarding users or devices that access or attempt to access containers that are associated with the entity 14. For example, the entity 14 and users of the entity 14 may have access to the container 16, and the security console 30 may maintain records (e.g., logs) or other data regarding devices and users that access and attempt to access the container 16. The security console 30 may be any suitable computing device, such as a general or special-purpose personal computer, a laptop computer, a tablet computer, a mobile computer, a server, and the like that is configured in accordance with present embodiments. For example, the security console 30 may include one or more computing devices (e.g., computers or servers) that belong to, or are associated with, the entity 14.

The diagnosis module 32 may communicate with the security console 30 and make determinations based on the data the security console receives (e.g., from the container 16 or container server 12) or generates. For instance, as discussed below, the diagnosis module 32 may analyze logs or other data received from the security console 30 to determine whether a device that has accessed or attempted to access the container 16 is a security threat. In other words, the diagnosis module 32 may determine whether a security breach has occurred or may occur. For example, the diagnosis module 32 may determine a likelihood of a device that has accessed or attempted to access the container 16 belonging to a hacker or otherwise posing a security threat. The diagnosis module 32 may utilize security information and management (STEM) techniques, security orchestration, automation, and response (SOAR) techniques, or both STEM and SOAR techniques to make determinations regarding devices or users that access or attempt to access the container 16 (or the entity 14 via the container 16). More specifically, the diagnosis module 32 may aggregate data (e.g., logs), identify events (e.g., potential security incidents), and analyze the events (e.g., to determine whether an event is a security incident, such as a breach). For example, the diagnosis module 32 may determine patterns in log data that are indicative of a cyberattack, correlate information between devices or the container 16 and a device (e.g., that has accessed or attempted to access the container 16), and send requests to the management node 22 of the container server 12. Additionally, the diagnosis module 32 may follow incident response algorithms or workflows to determine an action, if any, to take. The diagnosis module 32 may be any suitable computing device, such as a general or special-purpose personal computer, a laptop computer, a tablet computer, a mobile computer, a server, and the like that is configured in accordance with present embodiments. For example, the diagnosis module 32 may include one or more computing devices (e.g., computers or servers) that belong to, or are associated with, the entity 14. Additionally, in some embodiments, the diagnosis module 32 may be included in the security console 30.

The entity 14 may also include the storage 34, which may be a storage device or memory device maintained by the entity 14. The storage 34 may store logs or other data received or generated by the security console 30. Additionally, the storage 34 may be utilized to store data associated with the container 16. For example, the storage 34 may be utilized to back up data stored by the container 16, such as by storing a copy or version of data associated with the container 16.

Figure 2:
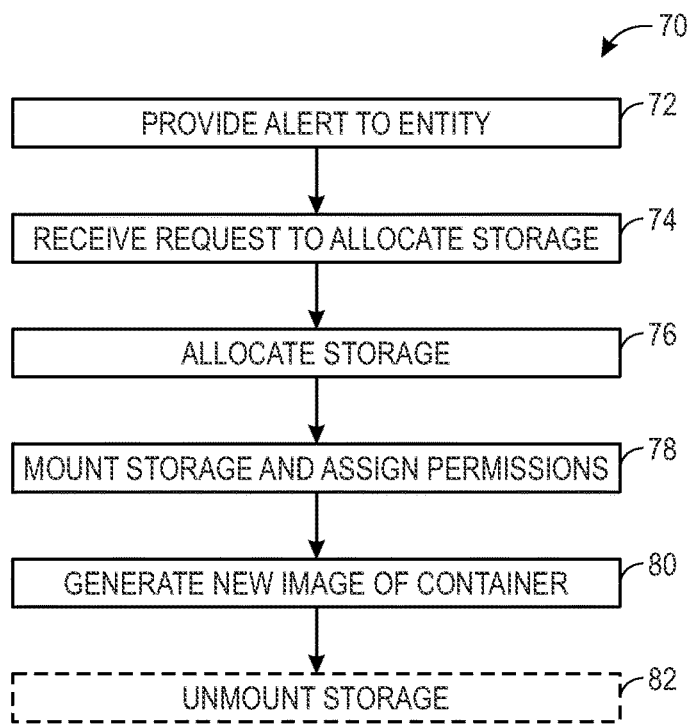
FIG. 2 is a flow chart of a process for altering an entity and respond to security threats, in accordance with aspects of the present disclosure.

Keeping the discussion of FIG. 1 in mind, FIG. 2 and FIG. 3 will now be discussed. FIG. 2 is a flow chart of a process 70 for alerting the entity 14 and responding to security threats. The process 70 may be performed by the container server 12, for example, in response to detecting a potential security threat regarding a container associated with the entity 14 (e.g., the container 16). The process 70 generally includes providing an alert to the entity 14 (e.g., process block 72), receiving a request to allocate storage (e.g., process block 74), allocating storage (e.g., process block 76), mounting the storage and assigning permissions (e.g., process block 78), and generating a new image of the container (e.g., process block 80). In some embodiments, the process 70 may also include unmounting the storage (e.g., process block 82).

Figure 3:
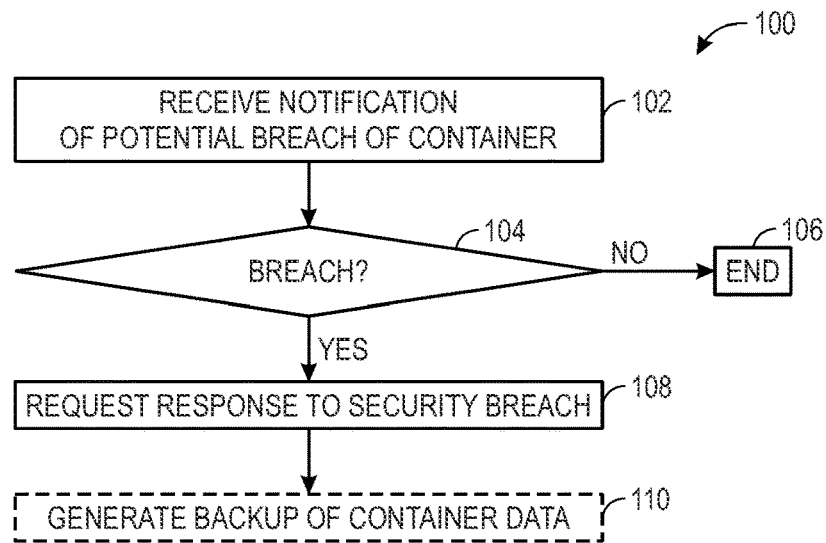
FIG. 3 is a flow chart of a process for responding to security threats, in accordance with aspects of the present disclosure.

Somewhat similarly, FIG. 3 is a flow chart of a process for responding to security threats that may be performed by the entity 14, for example, in response to receiving an alert from the container server 12. The process 100 generally includes receiving a notification of a potential security breach of a container 16 (e.g., process block 102), determining whether there is or has been a security breach (e.g., decision block 104), and requesting a response to the security breach be initiated when a security breach is determined to be present (e.g., process block 108). Additionally, in some embodiments, the process 100 may include generating a backup of container data (e.g., process block 110).

Performance of the process 70 may overlap with performance of the process 100. As such, the processes 70, 100 will be discussed together in an order that provides one example of how the processes 70, 100 may be performed. Accordingly, while the operations of the processes 70, 100 are discussed in one order below, the operations of the processes 70, 100 may be performed in a different order in other embodiments. Furthermore, in some embodiments, operations of the processes 70, 100 may be performed in an order different than the order discussed below.

Turning to FIG. 2, at process block 72, the container server 12 may send an alert to the entity 14. For example, the container 16 or another component of the container server 12 may send a notification to the security console 30 indicating that a potential cyberattack or other security incident has occurred or may be occurring.

Continuing to FIG. 3, at process block 102, the entity 14 may receive the alert. More specifically, the security console 30 of the entity 14 may receive a notification from the container 16 or container server 12 indicating that a breach or potential security breach involving the container 16 has or may occur. In some embodiments, at process block 102, the security console 30 may additionally receive data from the container 16 or container server 12 as well as generate data regarding the container 16. For example, the security console 30 may receive or generate logs regarding access or attempted access to the container 16.

At decision block 104, the entity 14 may determine whether a security breach has occurred. For example, the diagnosis module 32 may receive data from the security console 30 and analyze the data (e.g., using SIEM or SOAR techniques) to determine whether the container 16 has been hacked or otherwise breached. In some embodiments, the diagnosis module 32 may determine a score indicative of a likelihood of breach having occurred. In such embodiments, the diagnosis module 32 may determine that a breach has occurred when the score is equal to or greater than a threshold score. For instance, the diagnosis module 32 may determine that a breach has occurred when the score indicates that there is a 25%, 50%, 75%, 90% or other percentage (e.g., a percentage greater than 0%) likelihood that a breach has occurred. When the entity 14 determines that there is no breach, the process 100 may end (at process block 106).

However, when the entity determines that a breach has occurred, at process block 108, the entity 14 may request the container server 12 initiate a response to the security breach. For example, the entity 14 (e.g., via the diagnosis module 32) may send a request to the management node 22 of the container server 12 to provide storage. More specifically, the diagnosis module 32 may request that the management node 22 provision a portion of a network file storage that is managed by the management node 22. As described below, the container server 12 may take several actions based on the request sent at process block 108. It should be noted that these actions may be included as part of the request from the entity 14 to the container server 12.

Returning to FIG. 2, at process block 74, the container server 12 (e.g., via the management node 22) may receive the request to allocate storage and, at process block 76, allocate (e.g., provision) storage as requested by the entity 14. For example, the container server 12 may allocate a network location for storage that may be physically located on the storage 24. It should be noted that, in some embodiments, process block 74 may not be performed during execution of the process 70. For example, in some embodiments, the container server 12 may allocate storage in response to sending an alert to the entity 14.

At process block 78, the container server 12 mount the storage and assign permissions. For example, the container server 12 may mount the datastore to be provided and assign permissions to the data store (e.g., in a Unix-based operating system, using a "chmod" command) to make the datastore (or portion thereof) readable and writable. At process block 80, the container server 12 may generate a new image of the container 16. For example, the container server 12 may commit the data of the container 16 into a new image (e.g., a new image of the container 16 accessible via the container server 12). In some embodiments, committing the data may be done without pausing so that processes of the container 16 (e.g., processes associated with the applications 18) are not paused when the image is committed. When committing the data, the container server 12 (e.g., via the management node 22) may generate a read-only portion (e.g., a layer) of storage and generate a read/write (and, in some embodiments, execute) layer of storage. More specifically, a previously read/write layer of the datastore may become read-only, and a new layer that is readable and writable (and optionally executable) that has the data of the container 16 is generated.

Returning briefly to FIG. 3, at process block 110, the entity 14 may store the data of the container 16 locally, such as in the storage 34. Additionally, with reference to process block 82 of FIG. 2, the container server 12 may unmount the read-only layer of the datastore so that the data of the container 16 is no longer accessible. Thus, copies of the data of the container 16 may be stored by the entity 14 and another entity that maintains the container server 12. Moreover, the copy of the data maintained by the container server 12 may be made inaccessible (e.g., by unmounting the read-only layer discussed above).

In this manner, an immutable version of the container 16 may be generated while still providing a version of the container 16 that is still accessible. For instance, the data of the container 16 will be protected from the security threat (e.g., a hacker), However, from the perspective of the security threat, the container 16 and functionality thereof may appear unchanged. Thus, the data of the container 16 may be protected, and an intruder (e.g., the source of the security threat) may not discern that the intruder's presence has been detected and acted upon by the container server 12 and entity 14. Moreover, in this manner, the container server 12 may switch from providing a user (e.g., a user who poses a security threat) read and write access to a container to providing read-only access to a container. For example, a user may first be given read and write access to a layer of a datastore, the layer may be modified to be read-only, an image of the container associated with a readable and writable second layer of the datastore may be generated, and the user may be give read and write access to the second layer. Furthermore, the read-only layer may be unmounted so that the read-only layer no longer accessible.

The techniques discussed above are not limited to being used only in response to a potential security threat. For example, a "true" version or copy of the data of the container 16 may be saved offline as described above. When a device requests access to the container 16, the device can be provided a copy of the true copy. Accordingly, any changes made by the user will not be made to the true copy. Maintaining a true copy of the data of the container 16 may be used, for example, to compare the true data to changes made in a copy of the data to make determinations regarding the party accessing the copy of the data.

Figure 4:
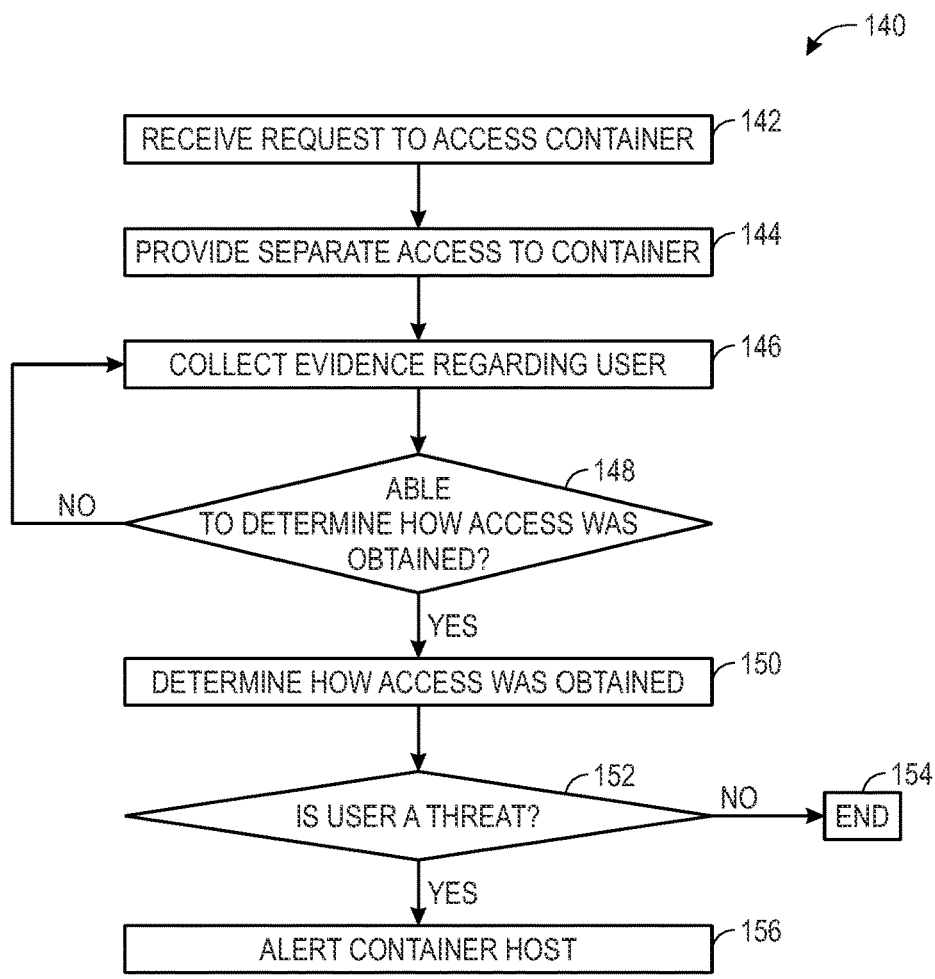
FIG. 4 is a flow chart for detecting whether a user to a container or serverless function is a security threat, in accordance with aspects of the present disclosure.

Additionally, the techniques discussed above may be utilized so that the entity 14 can detect security threats to the container 16 and alert the container server 12. With this in mind, FIG. 4, is a flow chart of a process 140 that the container system 10 may implement to detect whether a party accessing the container 16 is a security threat, such as a hacker that has illegitimately gained access to the container 16. The process 140 generally includes receiving a request to access a container (e.g., process block 142), providing separate access to the container (e.g., process block 144), collecting evidence regarding user (e.g., process block 146), determining whether there is sufficient evidence to determine how the user gained access to the container (e.g., decision block 148), determining how the user gained access to the container (e.g., process block 150), determining whether the user is a security threat (e.g., decision block 152), and alerting the host of the container (e.g., the container server 12) when the user is determined to be a security threat (e.g., process block 156).

At process block 142, the container system 10 may receive a request to access the container. For example, a user of a device attempting to access the container 16 may provide a request to the entity 14 or container server 12 to gain access to the container 16, and the container system 10 may receive such a request. More specifically, the request may be made to the entity 14 for the entity 14 to provide the user with access to the container 16.

In response to receiving the request the access the container 16, at process block 144, the container system 10 may provide separate access to the container 16. In particular, the container system 10 may provide the user with a copy (e.g., an image) of the container 16, while the true copy of the container remains protected and otherwise inaccessible to the user. For instance, in response to receiving the request, the container server 12 may generate the new image of the container 16 and unmount a read-only layer of the datastore that stores the data of the container 16 as described above with respect to FIG. 2. The true copy of the data (e.g., data saved to a read-only layer of a datastore) for the container 16 may have also previously been saved offline, thereby providing increased security of the data of the container 16. Accordingly, at process block 144, the user attempting to gain access may be provided access to a container 16 that may be characterized as being a backup of an already protected container 16. Additionally, it should be noted that the entity 14 may provide the separate access to the container 16. For example, in response to receiving the request to access the container 16, the entity 14 may send a request to the container server 12 to provide an image of the container 16 to the user.

At process block 146, the container system 10 (e.g., via the container server 12, entity 14, or both) may collect evidence about the user. For instance, the container system 10 may generate or receive data (e.g., logs) regarding the user and how the user gained access to the container 16. At decision block 148, the container system 10 (e.g., via the diagnosis module 32) may determine whether there is sufficient data to determine how the user obtained accessed to the container 16. For example, the diagnosis module 32 of the entity 14 may utilize certain types of log data to determine how the user accessed the container 16. However, in some cases the diagnosis module 32 may not have such data, for example, because the data has not yet been generated or provided to the diagnosis module 32. Thus, the diagnosis module 32 may be unable to determine how the user accessed the container 16. When the diagnosis module 32 is unable to determine how the user gained access to the container 16, the container system 10 may return to collect evidence regarding the user (at process block 146).

However, when the diagnosis module 32 determines that there is sufficient evidence to determine how the user obtained access to the container 16, at process block 150, the container system 10 may determine how the user obtained access to the container 16. More specifically, the diagnosis module 32 may determine how the user accessed the container 16 using log files. For example, if the user gained entrance via a storage driver, the diagnosis module 32 may determine that the user gained access from analyzing host logs.

At decision block 152, the diagnosis module 32 may determine whether the user is a security threat. The diagnosis module 32 may make such a determination based on how the user gained access to the container 16. For example, if the diagnosis module 32 determines that the user gained access to the container 16 via the container 16 directly, the diagnosis module 32 may determine that a cyberattack occurred and/or that the user poses a security a threat. However, if the diagnosis module 32 determines that the user has gained access to the container 16 in a permitted manner, the diagnosis module 32 may determine that the user is not a security threat. When the diagnosis module 32 determines that the user does not pose a security threat, at process block 154, the process 140 may end. In some embodiments, upon determining the user does not pose a security threat, the container server 12 may update a log or other data maintained by the container server 12 to indicate that the user is not a security threat. Moreover, in such embodiments, the container server 12 may compare changes between an original container (e.g., a first image of a container) and the container provided to the user (e.g., a second image of the container) so that the changes may be propagated to the original container.

However, if the diagnosis module 32 determines that the user poses a security threat, at process block 156, the entity 14 may alert the container server 12 that the user has gained access to the container 16 improperly. Based on the alert, the container server 12 may take actions against the user or actions to protect the container server 12 from the security threat.

It should be noted that while the discussion with respect to containers, the techniques described herein may be applied to serverless functions. For example, a copy (e.g., image) of a serverless function may be provided to a user that attempts to use the serverless function while another version of the data for the serverless function has been previously protected as described above with respect to containers.

Accordingly, the techniques discussed herein enable security threats, such as hacking attempts, to containers and serverless functions to be detected and mitigated. For example, because a copy (e.g., an image) of a container or serverless function can be provided to a user who attempts to access the container or serverless function while another version of the data of the container or serverless function is kept safe, the threat of the user to an entity that utilizes container or serverless function may be reduced or eliminated. Furthermore, because users who have improperly gained access to a container or serverless function may be presented with what appears to be the container or serverless function the users intended to access, the users may not recognize that they have not accessed the intended target, thereby further reducing the susceptibility of containers and serverless functions to being hacked or otherwise improperly accessed or used.

Exemplary embodiments discussed herein are not limited to the specific embodiments described herein, but rather, components of systems and/or steps of the methods may be utilized independently and separately from other components and/or steps described herein. For example, the methods, systems, and apparatus may also be used in combination with other systems and are not limited to practice with only the systems and methods as described herein. Rather, the exemplary embodiment can be implemented and utilized in connection with many other applications, equipment, and systems that may benefit certificate management and rotation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A container system comprising:
  a container server hosted by a first entity, the container server comprising processing circuitry configured to:
    host a first container comprising an execution of a first image;
    receive a request to access the first container;
    provide access to the first container;
    send an alert regarding the request to access the first container to a computing device of a second entity that has access to the first container, wherein the second entity is different than the first entity;
    receive an indication, from the computing device of the second entity and after sending the alert, that the request to access the first container is a potential security threat; and
    in response to receiving the indication:
      generate a second image comprising a copy of the first image; and
      switch from providing access to the first container to providing access to a second container comprising an execution of the second image.

2. The container system of claim 1, wherein:
  the first container corresponds to a first layer of a datastore; and
  the second container corresponds a second layer of the datastore.

3. The container system of claim 2, wherein the container server is configured to switch from providing access to the first container to providing access to the second container by switching from providing read and write access to the first container to providing read and write access to the second container.

4. The container system of claim 3, wherein, the container server is configured to switch from providing read and write access to the first container to providing read-only access to the first container prior to providing read and write access to the second container.

5. The container system of claim 1, wherein the container server is configured to generate the second container after sending the alert to the computing device of the second entity that utilizes the first container, wherein the alert is indicative of the request to access being a potential security threat.

6. The container system of claim 1, wherein the container server is configured to make a first layer of a datastore corresponding to the first container inaccessible via the Internet after generating the second container.

7. The container system of claim 6, comprising the computing device, wherein the computing device is configured to save a local copy of data from the first layer of the datastore prior to the container server making the first layer of the datastore inaccessible via the Internet.

8. The container system of claim 1, wherein, in response to receiving the indication, the container server is configured to provide read and write access to the second container while refraining from allowing access to the first container.

9. A non-transitory computer-readable medium comprising instructions that, when executed by one or more processors of a first entity, cause the one or more processors of the first entity to:
  host a first container comprising an execution of a first image;
  receive a request to access the first container;
  provide access to the first container;
  send an alert regarding the request to access the first container to a computing device of a second entity that has access to the first container, wherein the second entity is different than the first entity;
  receive an indication, from the computing device of the second entity and after sending the alert, that the request to access the first container is a potential security threat; and
  in response to receiving the indication:
    generate a second image comprising a copy of the first image; and
    switch from providing access to the first container to providing access to a second container comprising an execution of the second image.

10. The non-transitory computer-readable medium of claim 9, wherein the instructions, when executed by the one or more processors, cause the one or more processors to:
  determine how a user attempted to gain access the first container; and
  determine whether the user is a security threat based on how the user is determined to have attempted to gain access the first container.

11. The non-transitory computer-readable medium of claim 10, wherein the instructions, when executed by the one or more processors, cause the one or more processors to:
  collect or generate data regarding the user; and
  determine how the user attempted to gain access to the first container based on the data regarding the user.

12. The non-transitory computer-readable medium of claim 9, wherein:
  the first container corresponds to a first portion of a datastore; and
  the second container corresponds a second portion of the datastore.

13. The non-transitory computer-readable medium of claim 12, wherein the instructions, when executed by the one or more processors, cause the one or more processors to modify the first portion of the datastore to be read-only in response to determining the request to access is a security threat or receiving the indication that the request to access is a potential security threat.

14. The non-transitory computer-readable medium of claim 13, wherein the instructions, when executed by the one or more processors, cause the one or more processors to provide access to the second portion of the datastore after modifying the first portion of the datastore to be read-only.

15. The non-transitory computer-readable medium of claim 12, wherein the instructions, when executed by the one or more processors, cause the one or more processors to unmount the first portion of the datastore after switching from providing access to the first container to providing access to the second container.

16. A method, comprising:
hosting, via one or more processors of a first entity, a first container comprising an execution of a first image;
receiving, via the one or more processors, a request to access the first container;
providing, via the one or more processors, access to the first container;
sending, via the one or more processors, an alert regarding the request to access the first container to a computing device of a second entity that has access to the first container, wherein the second entity is different than the first entity;
receiving, via the one or more processors and from the computing device of the second entity after sending the alert, an indication that the request to access the first container is a potential security threat; and
in response to receiving the indication:
generating, via the one or more processors, a second image comprising a copy of the first image; and
switching, via the one or more processors, from providing access to the first container to providing access to a second container comprising an execution of the second image.

17. The method of claim 16, comprising determining, via the one or more processors, whether the request to access is a potential security threat.

18. The method of claim 17, comprising sending, via the one or more processors, the alert in response to determining the request to access the first container is a potential security threat.

19. The method of claim 18, wherein the alert is indicative of the request to access the first container being a potential security threat.

20. The method of claim 16, wherein:
providing access to the first container comprises providing, via the one or more processors, read and write access to the first container;
the method further comprises switching, via the one or more processors, from providing read and write access to the first container to providing read-only access to the first container in response to determining the request to access the first container is a potential security threat; and
switching from providing access to the first container to providing access to the second container comprises switching, via the one or more processors, from providing read-only access to the first container to providing read and write access to the second container.

* * * * *